United States Patent [19]
Hosoi

[11] 3,955,215
[45] May 4, 1976

[54] APPARATUS AND METHOD FOR FORMING A HEAD DRUM ASSEMBLY

[75] Inventor: Kenichi Hosoi, Tokyo, Japan

[73] Assignee: Sony Corporation, Tokyo, Japan

[22] Filed: Nov. 14, 1974

[21] Appl. No.: 523,904

[30] Foreign Application Priority Data
Dec. 14, 1973   Japan.......................... 48-144212[U]

[52] U.S. Cl.................................. 360/130; 360/84
[51] Int. Cl.²....................... G11B 15/60; G11B 5/52; G11B 15/26
[58] Field of Search ............... 360/130, 107, 84, 71, 360/128, 129, 102, 103; 226/196

[56] References Cited
UNITED STATES PATENTS

| | | | |
|---|---|---|---|
| 3,354,269 | 11/1967 | Rank | 360/130 |
| 3,567,869 | 3/1971 | Chigasaki et al. | 360/107 |
| 3,840,895 | 10/1974 | Kubo | 360/107 |
| 3,863,269 | 1/1975 | Akamine | 360/128 |

*Primary Examiner*—Alfred H. Eddleman
*Attorney, Agent, or Firm*—Hill, Gross, Simpson, Van Santen, Steadman, Chiara & Simpson

[57] ABSTRACT

Method and apparatus for producing a head drum for a video tape recorder and playback in which the head drum about which the tape passes is formed with a guide ledge so as to direct the tape past rotating magnetic heads and wherein the ledge is formed by cutting the surface of the head drums with a cutting tool and then providing a groove which undercuts the surface of the drum so as to form the ledge with a surface which is at right angles to the tangent of the tape engaging surface of the drum. By undercutting the surface of the drum to form the ledge assures that a radius will not be formed between the drum surface and the ledge, thus assuring accurate indexing of the lower edge of the video tape.

9 Claims, 5 Drawing Figures

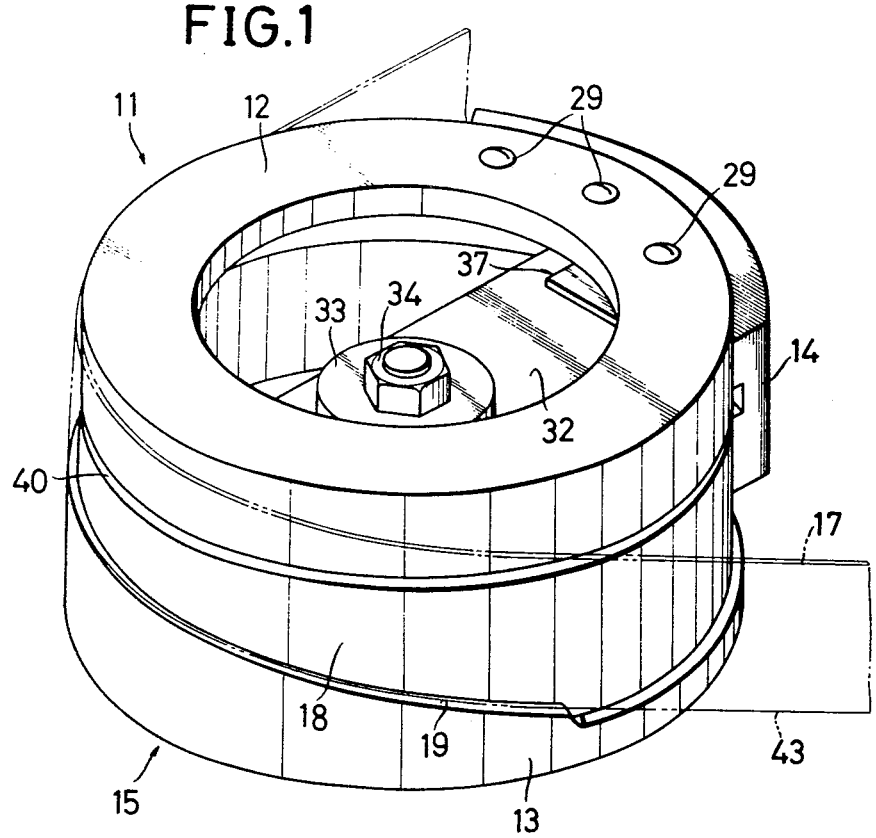
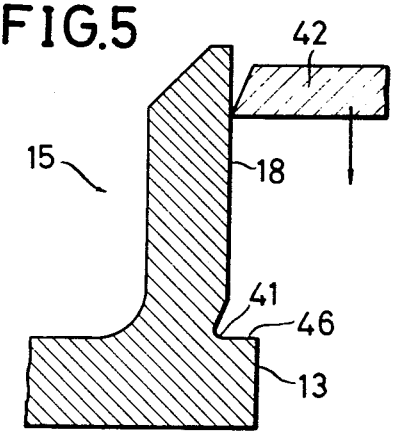

U.S. Patent  May 4, 1976  Sheet 2 of 2  3,955,215
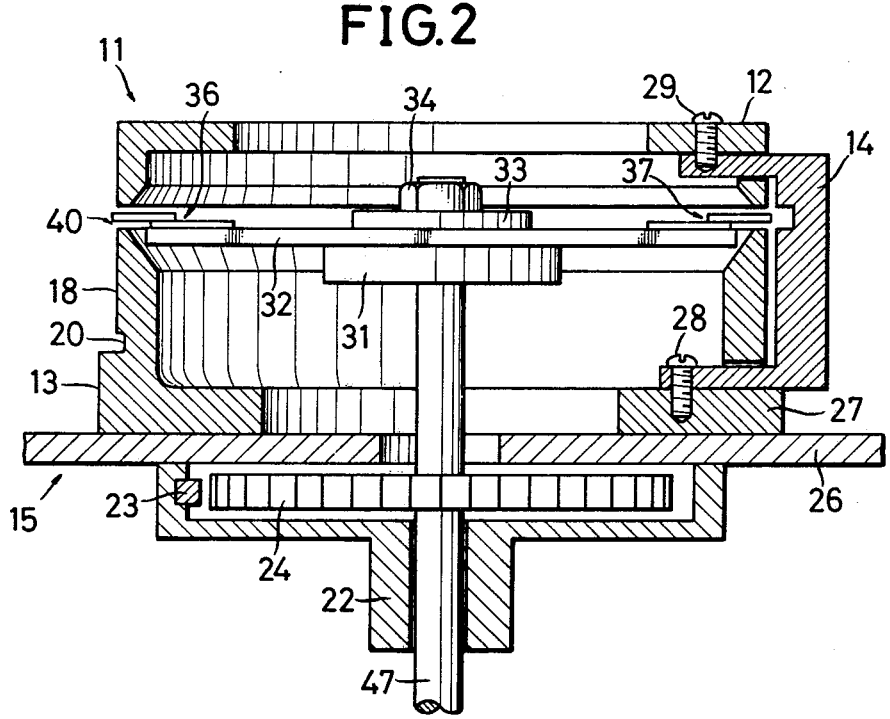
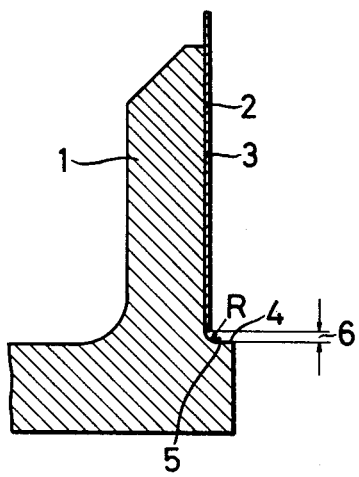
PRIOR ART
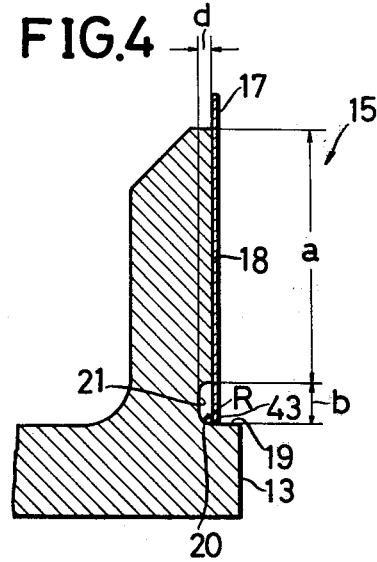

APPARATUS AND METHOD FOR FORMING A HEAD DRUM ASSEMBLY

FIELD OF THE INVENTION

This invention relates in general to a video tape recorder and reader and in particular to apparatus and method for producing an improved video tape drum.

DESCRIPTION OF THE PRIOR ART

A video tape head drum about which magnetic tape passes at a predetermined angle is formed of a smooth drum surface and a tape guide member which engages the lower edge of the tape so as to move the tape relative to the magnetic heads. The magnetic tape must be guided so as to maintain a predetermined height relative to the magnetic heads so that the magnetic heads can trace the predetermined tracks on the tape and such that such predetermined tracks are retraceable during playback.

In head drums of the prior art, a tape guide member is attached about the drum surface by a number of screws and the tape guide member is adjusted vertically so as to obtain the proper orientation. However, during the assembly process, it is very difficult to assemble the head drum and the guide member with great accuracy, and a special tool and equipment must be used to assemble the drum unit and a great deal time is required to properly adjust the head drum and the guide member.

Recently the head drum and the tape guide have been formed as a unitary unit by a cutting method, such that the guide and drum surface are formed from a cylindrical shaped aluminum cylinder, for example.

It is very difficult, however, to produce a sharp corner or edge between the guide portion and the drum surface with an accurate 90° surface, such that the tape is properly indexed on the 90° surface. This is because a cutting tool for a lathe which is used to cut the drum surface and the ledge becomes worn or curved as it is used for long periods of time, and the cutting tool thus provides a curve having a radius between the guide ledge and the drum surface. Such curve does not provide an accurate reference ledge surface for the tape, and thus the tape tracks in an inaccurate manner as it moves up and down on the curve thus formed.

SUMMARY OF THE INVENTION

It is an object of the present invention to provide a drum assembly and a method for constructing a drum assembly wherein at the junction point between the tape surface of the drum and the ledge which provides a guide reference for the tape is formed to be normal to the tape guide surface by providing a groove which undercuts the drum surface thus providing an edge guiding surface which is 90° to the drum surface.

During production, the drum surface is first cut by a cutting tool and then a groove is cut by another cutting tool which undercuts the drum surface and forms the edge guide for the video tape. The groove may be cut with a cutting tool which is narrower than the cutting tool used for forming the major portion of the drum surface.

It is preferred that the width of the groove be one millimeter or narrower, and that the depth of the groove be between 5 and 15 microns, and in a preferred embodiment, the width of the groove was 0.5 millimeters and the depth was 10 microns.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which

BRIEF DESCRIPTION OF THE DRAWINGS

FIG. 1 is a perspective view of the head assembly of a video tape machine;

FIG. 2 is a sectional view through the head drum assembly;

FIG. 3 illustrates a detailed sectional view of the prior art drum surface;

FIG. 4 is an enlarged detailed view of the invention; and

FIG. 5 illustrates a modification of the invention.

DESCRIPTION OF THE PREFERRED EMBODIMENTS

FIG. 1 is a perspective view of a head drum assembly 11 for a video tape reader or recorder, and comprises a shaft 47 which is driven by a suitable motor and which carries on its upper end a disc 31 against which a head supporting arm 32 rests. A second disc 33 is mounted on the shaft 47 adjacent the arm 32 and the upper end of shaft 47 carries a suitable fastening means 34 which attaches the assembly together. As the shaft rotates, magnetic heads 36 and 37 carried on opposite ends of the rotating arm 32 are rotated relative to a gap 40 formed between upper drum member 12 and lower drum member 15. The magnetic tape 17 rides about the lower drum and its bottom edge 43 engages an index ledge 19 formed in the lower drum 13, so that substantially all portions of the tape 17 pass by the gap 40, so that the magnetic heads 36 and 37 can scan the tape.

FIG. 3 illustrates prior art methods of forming a ledge wherein the ledge 4 in the lower drum 1 has a radius R designated by numeral 5 in FIG. 3, against which the lower edge of the tape 2 rests as it engages the surface 3 of the lower drum. Due to the radius R illustrated in FIG. 3 with prior art drums, the horizontal ledge 4 is not always in engagement with the tape 2, but the tape rides up and down on the curved radius surface 5, thus giving an imprecise vertical reference to the tape, which leads to misalignment between the magnetic reading and writing heads and to improper indexing.

FIG. 4 is a detailed sectional view of the invention, wherein a ledge 19 against which the lower edge of the tape 17 rests, is horizontal or at right angles to the surface 18 of the drum, thus providing an accurate and precise index for the tape 17. This is accomplished by cutting the surface 18 of the drum and then by providing a cut which extends beyond the surface 18, illustrated by the groove or depression 21 and which still has the radius portion 20 but it is to be particularly noted that the radius portion 20, due to the groove 21, is not engaged by the lower edge of the tape 17, but rather the tape edge rests against the precise index surface 19 at all times. This assures that the tape will be positively and accurately referenced so that the heads 36 and 37 will precisely track the predetermined tracks on the tape.

During manufacture the lower drum is placed in a lathe and rotated and a cutting tool of the lathe engages the surface of the lower drum and cuts it.

For example, if the cutting tool is held stationary, the head drum may be moved longitudinally with a cam mechanism so as to precisely locate the surface 19 as the drum is cut and as many as 2,000 rotations of the drum may occur as the cut in the lower drum is made. After the major portion 18 of the lower drum surface has been cut, the groove 21 is cut by inserting another cutting tool into the lathe, and which may be a very narrow cutting tool, and the groove 21 is undercut from the surface 18 so as to precisely determine the surface 19 at right angles to the surface 18 of the drum and to prevent the lower edge of the tape 17 from engaging the curved radius portion 20. For example, the dimension b in FIG. 4 of the groove 21 might be 1 mm or less, and the depth might be in the range of 5 to 15 microns. In a particular example, for example, the dimension $b$ was 0.5 mm, and the depth $d$ illustrated in FIG. 4 was 10 microns. Dimension $a$ defines the tape engaging surface.

In the embodiment illustrated in FIGS. 1 and 2, the upper and lower drums 12 and 13 are connected together by a coupler 14 and are mounted on a VTR chassis. Upper drum 12 may be attached to coupler 14 by bolts 29 and lower drum 13 may be connected to coupler 14 by bolts 28. The lower portion 27 of the lower drum 13 is connected to the drum table 26 which has a sleeve 22 through which shaft 47 extends. In other embodiments, however, the upper drum 12 may be disconnected from the lower drum 13 and may rotate with the magnetic heads 36 and 37, while the lower drum 13 is stationary. In another embodiment, both the lower and upper drums may freely rotate together or separately.

In the embodiment illustrated in FIG. 4, the cross section of the groove 21 has a generally rextangular shape with a curved radius as its lower inner edge. However, the groove may also be formed as illustrated in FIG. 5, where the lower drum 13 is cut with a cutting tool 42, which has an end angle of 3° and the cutting tool 42 is moved along the surface 18 so as to cut the surface of the lower drum 13 and as it reaches the bottom surface 46, the tool 42 is moved into the surface of the drum 13 to undercut it to form a triangular shaped undercut 41, thus assuring that the bottom surface 46 will be accurately indexed so as to accurately position the tape 17.

In the embodiment illustrated in FIG. 5, for example, the surface 18 is cut 0.2 mm from the outer surface of the drum, and the triangular shaped undercut (41) is cut approximately 0.026 mm at the lower portion and has an approximately 3° cutting surface which provides a height of the undercut portion 41 of 0.5 mm, as shown in FIG. 5. It is preferred that the angle of the cutting surface is selected to be 2~5 degrees, most preferably 3°.

In an actual embodiment, as shown in FIG. 2, a magnetic signal carrying disc 24 may be mounted on shaft 47 and a rotation sensor 23 may be mounted to the lower drum 13 to provide an output which indicates the position of the shaft 47.

It is seen that this invention provides apparatus and method of producing a head drum assembly for a video tape machine which accurately indexes the lower edge of a tape 43, so that tracking of magnetic scanning heads can be precisely accomplished.

Although as shown in FIG. 4 the surface 19 extends at right angles to the surface 18, it should be realized that only the tape edge engaging portion need be at right angles to the tangent of the tape engaging surface 19 and beyond that point the surface 19 could extend upwardly.

Although the invention has been described with respect to preferred embodiments, it is not to be so limited as changes and modifications may be made which are within the full intended scope of the invention as defined by the appended claims.

I claim as my invention:

1. A head drum assembly having a rotary magnetic head about which a magnetic tape is wrapped comprising:
    a. a smooth drum surface which the tape surface contacts;
    b. a tape guide portion being adjacent to said drum surface as one unit and having a projecting portion of said drum surface which engages one edge of said tape and determines the tape position relative to said rotary magnetic head; and
    c. a groove formed in the drum surface at the corner between said drum surface and said tape guide portion such that said tape guide portion forms a very accurate index for said tape.

2. A head drum assembly including a lower drum of generally cylindrical shape formed with a tape guiding shoulder which varies longitudinally thereof to move the tape longitudinally of the lower drum, and wherein at least the tape engaging portion of said shoulder is at right angles to the tangent of the tape engaging surface of said drum so as to form an accurate longitudinal reference for said tape to precisely index said tape and wherein a radial extending groove is formed in said lower drum such that the lower surface of said groove forms said tape guiding shoulder and said groove extends into said lower drum below the tape engaging surface of the side wall of said drum, thus forming a very accurately indexed tape engaging surface.

3. A head drum assembly according to claim 2, wherein said groove is generally rectangular in cross section.

4. A head drum assembly according to claim 3, wherein said groove has a depth between 5 to 15 microns from said tape engaging surface of said side wall.

5. A head drum assembly according to claim 3, wherein said groove has a depth of about 10 microns from said tape engaging surface of said side wall.

6. A head drum assembly according to claim 3, wherein said groove extends less than 1 millimeter in the vertical direction.

7. A head drum assembly according to claim 3, wherein said groove extends about 0.5 millimeters in the longitudinal direction.

8. A head drum assembly according to claim 2, wherein said groove is generally triangular in cross section.

9. A head drum assembly according to claim 8, wherein said triangular groove makes an angle of 2~5 degrees with said tape engaging surface of said side wall and extends longitudinally about 0.5 millimeters.

* * * * *